US007734653B2

(12) United States Patent
Dykes et al.

(10) Patent No.: US 7,734,653 B2
(45) Date of Patent: Jun. 8, 2010

(54) FRAMEWORK TO ALLOW ONE CMP EJB TO CONNECT TO MULTIPLE DATA SOURCES

(75) Inventors: Pernell James Dykes, Rochester, MN (US); Teresa Chung Kan, Rochester, MN (US); William T. Newport, Rochester, MN (US); Jian Tang, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1109 days.

(21) Appl. No.: 11/025,228

(22) Filed: Dec. 29, 2004

(65) Prior Publication Data

US 2006/0143156 A1 Jun. 29, 2006

(51) Int. Cl.
*G06F 7/00* (2006.01)
*G06F 17/30* (2006.01)
(52) U.S. Cl. .................. 707/795; 707/705; 707/792
(58) Field of Classification Search ................ None
See application file for complete search history.

(56) References Cited

U.S. PATENT DOCUMENTS 6,985,912 B2 * 1/2006 Mullins et al. .......... 707/103 R

2002/0147763 A1 * 10/2002 Lee et al. ................. 709/202
2004/0111701 A1 * 6/2004 Beust ...................... 717/108
2006/0015839 A1 * 1/2006 Owens et al. ............. 717/100

OTHER PUBLICATIONS

"Using Container-Managed Persistence for Entity Beans," http://216.109.117.135/search/cache?p=container+managed+persistence+ejb+data+source . . . .

* cited by examiner

*Primary Examiner*—Etienne P LeRoux
*Assistant Examiner*—Susan Y Chen
(74) *Attorney, Agent, or Firm*—Wood, Herron & Evans, LLP

(57) ABSTRACT

A container managed persistent (CMP) enterprise java bean (EJB) framework includes support for accessing multiple data sources within one deployment. A CMP EJB includes a number of different attributes that can be a variety of values. A session EJB that acts as a front-end to the CMP EJP includes a resource reference for each of the different data sources that the entity CMP EJB may utilize. The application server environment includes a map that defines mapping information between the attributes of the CMP EJB and the resource references of the session EJB. Using the mapping information during runtime, the application server connects to the appropriate data source.

9 Claims, 3 Drawing Sheets

FRAMEWORK TO ALLOW ONE CMP EJB TO CONNECT TO MULTIPLE DATA SOURCES

FIELD OF THE INVENTION

The invention relates to applications, and in particular, to container managed persistent enterprise java beans (CMP EJB's).

BACKGROUND OF THE INVENTION

The Java 2 Platform, Enterprise Edition (J2EE) is an open and standard based platform for developing, deploying and managing n-tier, Web-enabled, server-centric, and component-based enterprise applications. Within this environment there are three types of enterprise java beans (EJB): entity beans, session beans, and message-driven beans.

Of particular interest are entity beans which are used to implement a complex business entity. An entity bean models a business entity or models multiple actions within a business process. Entity beans are often used to facilitate business services that involve data and computations on that data. For example, an application developer might implement an entity bean to retrieve and perform computation on items within a purchase order. The entity bean can manage multiple, dependent, persistent objects in performing its necessary tasks.

Thus, an entity bean is typically characterized as a remote object that manages persistent data, performs complex business logic, potentially uses several dependent Java objects, and can be uniquely identified by a primary key. Entity beans are normally considered coarse-grained persistent objects, because they utilize persistent data stored within several fine-grained persistent Java objects.

Entity beans are persistent because they are capable of surviving a server crash or a network failure. When an entity bean is re-instantiated, the states of previous instances are automatically restored.

Each entity bean has a persistent identity associated with it. That is, the entity bean contains a unique identity that can be retrieved if one has the primary key—given the primary key, a client can retrieve the entity bean. If the bean is not available, the container instantiates the bean and repopulates the persistent data.

The persistence for entity bean data is provided both for saving state when the bean is passivated and for recovering the state when a failover has occurred. Entity beans are able to survive because the data is stored persistently by the container in some form of data storage system, such as a database. Entity beans persist business data using one of the two following methods: a) Automatically by the container using a container-managed persistent (CMP) entity bean, or b) Programmatically through methods implemented in a bean-managed persistent (BMP) entity bean. These methods use JDBC or SQLJ to manage persistence in a relational database; or use any API to manage persistent data in non-relational store.

While there are various trade-offs when determining how to manage persistence for an EJB, one of these trade-offs involves how to manage EJB references to data sources. For example, an EJB may retrieve different fields of data from various tables of a database. Within the coding of the EJB application, the code specifies the identity of this database or data source.

A BMP EJB can connect to multiple data sources by defining within itself multiple data sources and then looking up these data sources during run time. However, in contrast, during deployment, a CMP EJB can only specify one data source in the persistence data that is managed for it. Thus, for a CMP EJB to connect to multiple, different databases, the CMP EJB must be deployed for each different database and bound to one data source at a given runtime. Multiple deployments of a CMP EJB add to the complexity of the application server environment and unnecessarily utilize resources within this environment. Thus, there remains the need within current J2EE Applications for a manner of enabling one deployment of a CMP EJB to access multiple data sources.

SUMMARY OF THE INVENTION

Embodiments of the present invention relate to a J2EE framework that includes support for one CMP EJB to access multiple data sources within one deployment. While the specific examples and embodiments provided herein are described specifically within a J2EE platform, one of ordinary skill will recognize that any platform that simulates or emulates at least some of the characteristics of the J2EE platform will support embodiments of the present invention.

One aspect of the present invention relates to a method for accessing more than one database within an execution environment wherein each database is associated with a respective data source, e.g., a data source used by a J2EE application to define the connect information for the associated database. In accordance with this aspect of the invention, a request is received from an executing container managed persistent enterprise java bean (CMP EJB) to access one of the more than one database, and one of the data sources from among the respective data sources is selected. The CMP EJB is dynamically connected to the selected one of the respective data sources in order to service the request during runtime.

Another aspect of the present invention relates to a method for accessing more than one database within a J2EE application server platform. In accordance with this aspect, each of more than one data source is associated with a respective resource reference, and a mapping between an attribute of a container managed persistent enterprise java bean (CMP EJB) and the respective resource reference is identified. Which one of the more than one data sources to use to service a call to access one of the database servers is then determined, for example, based on the mapping information.

DETAILED DESCRIPTION

Embodiments of the present invention relate to a J2EE framework that includes support for one CMP EJB to access multiple data sources within one deployment. A specific implementation of such a framework capable of supporting this functionality in a manner consistent with the invention will be discussed in greater detail below. However, prior to a discussion of such a specific implementation, a brief discussion will be provided regarding an exemplary hardware and software environment within which such a J2EE framework may reside.

Figure 1:
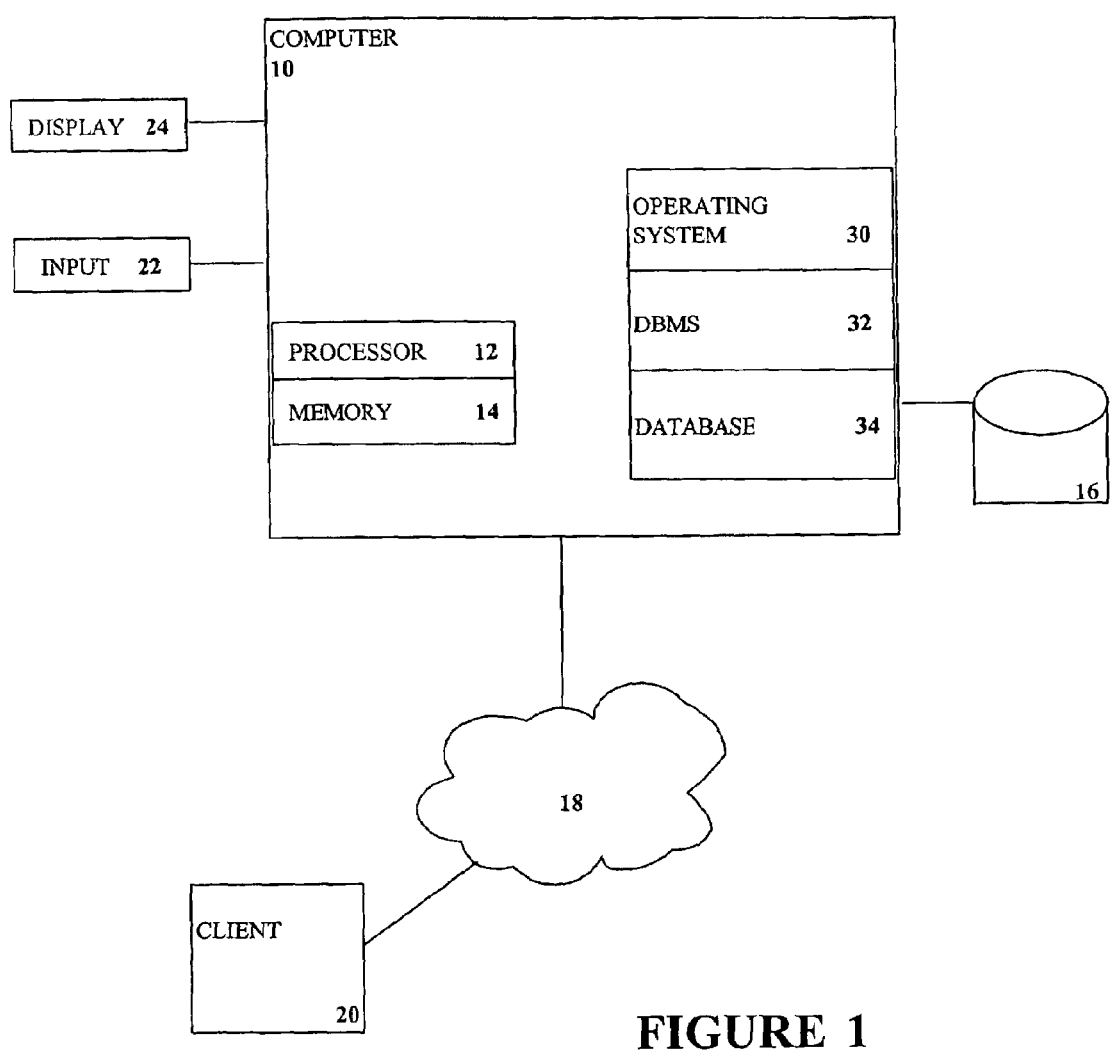
FIG. 1 is a block diagram of a networked computer system incorporating a J2EE platform consistent with the invention.

Turning now to the Drawings, wherein like numbers denote like parts throughout the several views, FIG. 1 illustrates an exemplary hardware and software environment for an apparatus 10 suitable for implementing a runtime platform, such as J2EE, in accordance with the principles of the present invention. For the purposes of the invention, apparatus 10 may represent practically any type of computer, computer system or other programmable electronic device, including a client computer, a server computer, a portable computer, a handheld computer, an embedded controller, etc. Moreover, apparatus 10 may be implemented using one or more networked computers, e.g., in a cluster or other distributed computing system. Apparatus 10 will hereinafter also be referred to as a "computer", although it should be appreciated the term "apparatus" may also include other suitable programmable electronic devices consistent with the invention.

Computer 10 typically includes at least one processor 12 coupled to a memory 14. Processor 12 may represent one or more processors (e.g., microprocessors), and memory 14 may represent the random access memory (RAM) devices comprising the main storage of computer 10, as well as any supplemental levels of memory, e.g., cache memories, non-volatile or backup memories (e.g., programmable or flash memories), read-only memories, etc. In addition, memory 14 may be considered to include memory storage physically located elsewhere in computer 10, e.g., any cache memory in a processor 12, as well as any storage capacity used as a virtual memory, e.g., as stored on a mass storage device 16 or on another computer coupled to computer 10 via network 18 (e.g., a client computer 20).

Computer 10 also typically receives a number of inputs and outputs for communicating information externally. For interface with a user or operator, computer 10 typically includes one or more user input devices 22 (e.g., a keyboard, a mouse, a trackball, a joystick, a touchpad, and/or a microphone, among others) and a display 24 (e.g., a CRT monitor, an LCD display panel, and/or a speaker, among others). Otherwise, user input may be received via another computer (e.g., a computer 20) interfaced with computer 10 over network 18, or via a dedicated workstation interface or the like.

For additional storage, computer 10 may also include one or more mass storage devices 16, e.g., a floppy or other removable disk drive, a hard disk drive, a direct access storage device (DASD), an optical drive (e.g., a CD drive, a DVD drive, etc.), and/or a tape drive, among others. Furthermore, computer 10 may include an interface with one or more networks 18 (e.g., a LAN, a WAN, a wireless network, and/or the Internet, among others) to permit the communication of information with other computers coupled to the network. It should be appreciated that computer 10 typically includes suitable analog and/or digital interfaces between processor 12 and each of components 14, 16, 18, 22 and 24 as is well known in the art.

Computer 10 operates under the control of an operating system 30, and executes or otherwise relies upon various computer software applications, components, programs, objects, modules, data structures, etc. (e.g., database management system 32 and database 34, among others.) Moreover, various applications, components, programs, objects, modules, etc. may also execute on one or more processors in another computer coupled to computer 10 via a network 18, e.g., in a distributed or client-server computing environment, whereby the processing required to implement the functions of a computer program may be allocated to multiple computers over a network.

In general, the routines executed to implement the embodiments of the invention, whether implemented as part of an operating system or a specific application, component, program, object, module or sequence of instructions, or even a subset thereof, will be referred to herein as "computer program code," or simply "program code." Program code typically comprises one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of computer readable signal bearing media used to actually carry out the distribution. Examples of computer readable signal bearing media include but are not limited to recordable type media such as volatile and non-volatile memory devices, floppy and other removable disks, hard disk drives, magnetic tape, optical disks (e.g., CD-ROM's, DVD's, etc.), among others, and transmission type media such as digital and analog communication links.

In addition, various program code described hereinafter may be identified based upon the application within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Figure 2:
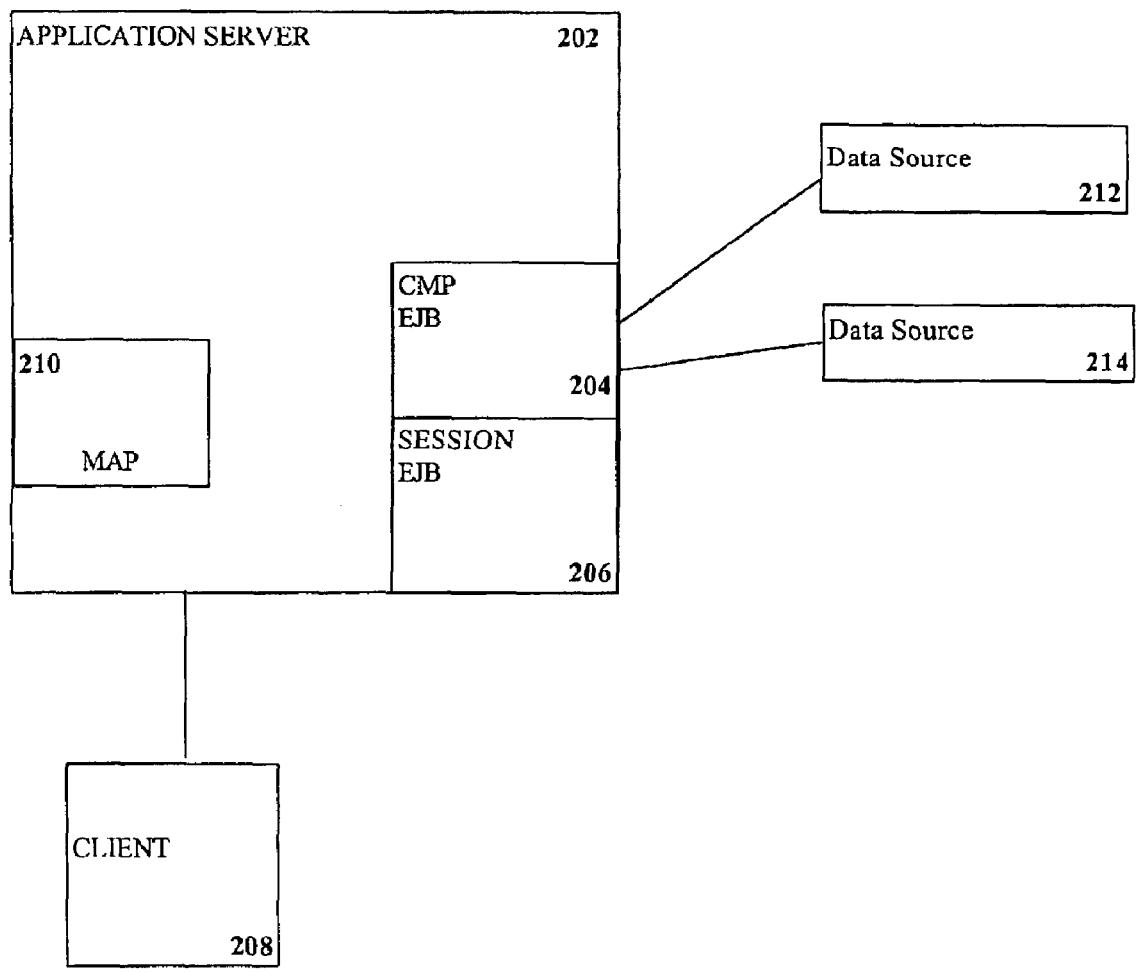
FIG. 2 is a block diagram illustrating the principal components of a J2EE platform consistent with the principles of the present invention.

FIG. 2 depicts an example application server environment in which embodiments of the present invention may be implemented. This application server may execute on a computer platform such as that described in FIG. 1, or any similar system. In the broadest view, a user in this environment accesses an application on the application server 202 in order to perform some business function. One example business function that may be performed is the generation of an SQL statement that is executed on one of the data sources 212, 214. The application server 202, the java environment, the java beans 204, 206 all operate together to "hide" the programming details from the user, or client, 208. Thus, the client may want to know what the total sales for a certain geographic area was in the last two months compared to a year ago. These business functions are implemented as one or more EJBs that operate within the application server 202. As for nomenclature, an EJB is first developed or written, and then it is deployed within the application server environment. When referenced or "called" within the application server environment by some other object, then an EJB is executed or instantiated.

Within the environment of FIG. 2, a client 208 does not typically interact with an entity bean such as the CMP EJB 204. The way applications are typically developed and deployed involves a session EJB 206 acting as a facade, or front-end, for an entity bean. Usually, a session bean 206 is a transient object that is invoked to accomplish one of the tasks or services offered by the entity bean CMP EJB 204. According to this programming model, an application developer uses a stateless session EJB during a communications session, or transaction, with a client 208 and it is the session EJB 206 that uses an appropriate interface to interact with the entity bean 204. Again, this arrangement separates the user from the programmatic details of the tasks provided by the entity bean.

When developing the session EJB 206, a developer will define resource references within the session EJB. These resource references refer to different resources that the session EJB may reference. While there may be many resource references defined in a session EJB, in this case, the resource references of interest include the data sources that the CMP EJB 204 may use. Thus, if during operation, the entity bean (CMP EJB 204) might need to access different data sources, a resource reference for each of these different data sources is defined within the session bean. A resource reference is defined by a series of XML statements that identify the characteristics (e.g., name, path, references, etc.) of the resource. While a developer can manually create the code for the session bean and entity bean, he or she would typically use a development environment that generates the various XML bean descriptors that are needed within the J2EE environment.

Although not critical to an understanding of the present invention, the environment in which the application server 202 is deployed should be able to communicate with the databases, or database servers, that will service the requests of the CMP EJB 204. Thus, data sources 212, 214 are abstract connections to a respective database or database server (not shown in FIG. 2). The CMP EJB accesses a database or database server by invoking some method provided by the application server 202 to connect to one of the data sources 212, 214. As used herein, the phrases "connecting to a database server," "connecting to a database" and "connecting to a data source" are equivalent and simply refer to a different level of abstraction.

A map 210 is provided that maps CMP EJB attributes to resource references. The attributes of a CMP EJB include a variety of variables the can assume different values for each different instantiation of the CMP EJB. For example, to illustrate one exemplary implementation of map 210, assume for the purposes of the example that the CMP EJB 204 represents an employee and one of the attributes defined in the descriptor for this bean is an "employee number". If for example, an employee's employee number inherently includes information about the employee's location, then a West Coast DB2 server (having a resource reference of "JDBC_1") running on Linux might house employee information for all employees located west of the Mississippi river, while an Informix database server (having a resource reference of "JDBC_2") in New York might store employee information for employees east of the river. Assuming employees with numbers A001-A499 are on the West Coast server and employees with numbers A500-A999 are on the East Coast server, then the attribute of "employeenumber" can be used to identify one of two different data sources to access. One example query may ask for the employment start date of the employee number A302. In such an example query, the employee number (A302) would indicate that the West Coast server (JDBC_1) should be accessed.

The map 210 may be implemented as an XML file, a database table, a property file, or even using program logic, as well as other possible alternatives without departing from the scope of the present invention. Regardless of its format, the map provides a mapping between a) the CMP EJB attribute and b) the resource references in the session EJB. A respective map 210 may be included for a number of different attributes, if desired. Furthermore, a map 210 may combine multiple attributes, such as in a boolean manner, to identify a resource reference to use.

Thus, in the example above, the map 210 would implement the logic:

If employee number is between A001 and A499, then use the resource reference JDBC_1; else if the employee number is between A500 and A999 then use the resource reference JDBC_2.

One of ordinary skill will recognize that any of a wide variety of different attributes, attribute values, and combinations of attributes may be used to select from different resource references without departing from the scope of the present invention.

Figure 3:
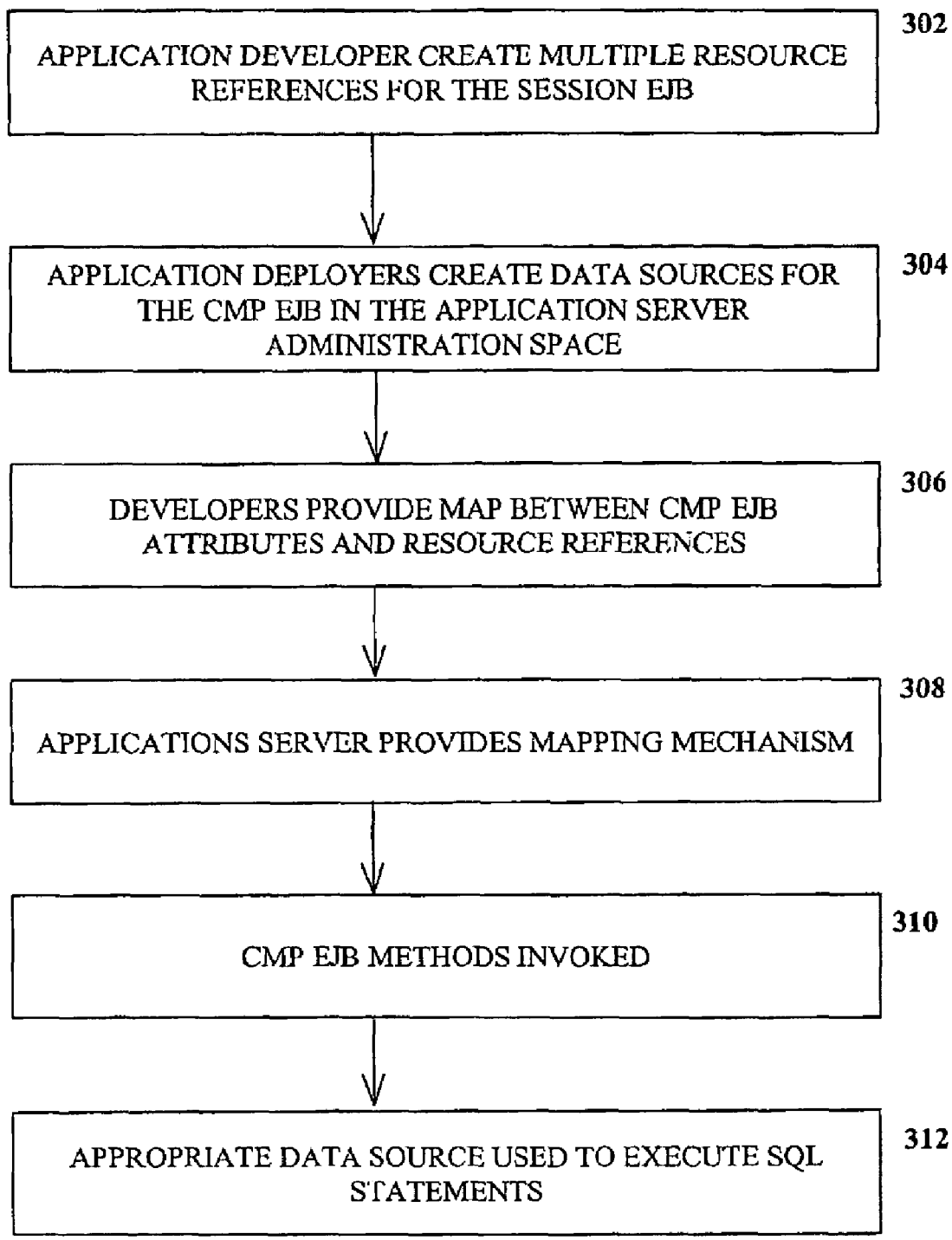
FIG. 3 illustrates a flowchart of an exemplary method for accessing data sources for a CMP EJB in accordance with the principles of the present invention.

FIG. 3 depicts a flowchart of an exemplary algorithm for accessing different data sources from a CMP EJB in accordance with the principles of the present invention. In step 302, the application developer creates a resource reference for each of the different database servers that may be accessed by the CMP EJB. These resource references are created in a session EJB and will typically be automatically created using a development interface to simplify their creation.

As mentioned previously, the deployment environment for the application server will include, in step 304, a respective data source corresponding to each of the database servers that can be accessed by the CMP EJB. These data sources are maintained within the administrative domain of the application server. In the J2EE environment, a data source is an abstract connection that implements standard logic to actually interface with a database server.

The application developers, or some other administrator, will also provide, in step 306, a map that provides mapping information between one or more attributes of the CMP EJB and the resource references. More specifically, the attributes of the CMP EJB may take on certain values and the map defines which of the resource references to use based on the value of the attribute.

In accordance with the principles of the present invention, the application server includes a mapping function that utilizes, during run-time, the map provided by the developers. The map is initialized by the session bean. During the initialization, the resource references defined in this session bean will be resolved to the global JNDI names of corresponding data sources. In particular, when a session EJB calls a method of the CMP EJB, in step 310, the "getConnection( )" method is invoked by the application server and the application server will recognize that a data source identity is required. The mapping mechanism will utilize the information about attributes from the CMP EJB and the resource references in the session EJB to determine which data source to use to get the connection.

Thus the ultimately underlying SQL statements invoked, in step 312, to retrieve information from a data source will be performed on the appropriate data source. In this way, a CMP EJB can be used to dynamically access at least two different data sources without requiring deployment of different CMP EJB's.

In accordance with the principles of the present invention, the application server of the J2EE will determine when a CMP EJB is being used to access a data source and instead of merely accessing the data source, will, instead, check mapping information to determine which of a plurality of data sources to access. As described above, the mapping information may advantageously map between attributes of the CMP EJB and resource references within a session EJB that is used to call the CMP EJB. It will be appreciated that implementation of the aforementioned functionality within a J2EE environment would be within the abilities of one of ordinary skill in the art having the benefit of the instant disclosure.

Various modifications may be made consistent with the invention. For example, in the embodiment discussed above, the resource references are defined and the map is initialized in the session bean. However, in other embodiments, the resource references can be defined in other java artifacts. For example, the resource references may be defined, and/or the map may be initialized, in the CMP EJB so the namespace of the CMP EJB will be used. In still other embodiments, it may be desirable to utilize a java artifact that meets the following criteria: 1) it should be able to define a resource reference, so the assembler or deployer can decide which data source in the administration space will be used; and 2) the map should be initialized in the java artifact to use the namespace of that java artifact, so the resource references get resolved correctly.

Various additional modifications may be made to the illustrated embodiments without departing from the spirit and scope of the invention. Therefore, the invention lies in the claims hereinafter appended.

What is claimed is:

1. A method for accessing a database server among a plurality of database servers within a J2EE application server platform, comprising the steps of:
    associating each of more than one data source with a respective resource reference;
    identifying a mapping between an attribute of a container managed persistent enterprise java bean (CMP EJB) and the respective resource references;
    determining based upon the identified mapping which of the more than one data sources to use to service a call by the CMP EJB to access one of the database servers;
    servicing the call by the CMP EJB by connecting to the determined which of the more than one data sources to access one of the database servers; and
    defining the respective resource references within a session EJB that interfaces with the CMP EJB.

2. The method of claim 1, further comprising the steps of:
    determining a value of the attribute;
    evaluating the mapping based on the value to identify which of the one or more data sources to use.

3. A method for accessing a database server among a plurality of database servers within a J2EE application server platform, comprising the steps of:
    associating each of more than one data source with a respective resource reference;
    identifying a mapping between an attribute of a container managed persistent enterprise java bean (CMP EJB) and the respective resource references;
    determining based upon the identified mapping which of the more than one data sources to use to service a call by the CMP EJB to access one of the database servers;
    servicing the call by the CMP EJB by connecting to the determined which of the more than one data sources to access one of the database servers; and
    defining the respective resource references within a java artifact that interfaces with the CMP EJB.

4. A method for accessing a database server among a plurality of database servers within a J2EE application server platform, comprising the steps of:
    associating each of more than one data source with a respective resource reference;
    identifying a mapping between an attribute of a container managed persistent enterprise java bean (CMP EJB) and the respective resource references;
    determining based upon the identified mapping which of the more than one data sources to use to service a call by the CMP EJB to access one of the database servers; and
    servicing the call by the CMP EJB by connecting to the determined which of the more than one data sources to access one of the database servers;
wherein a map is stored in the application server platform that provides the mapping between the attribute of the CMP EJB and the respective resource references, and wherein the map defines which of the respective resource references to use depending on a value of the attribute.

5. A method for accessing a database among a plurality of databases within an execution environment wherein each database is associated with a respective data source, comprising the steps of:
    receiving a request from an executing container managed persistent enterprise java bean (CMP EJB) to access one of the plurality of databases;
    selecting one of the data sources from among the respective data sources; and
    connecting the CMP EJB to the selected one of the respective data sources to access the database associated with the selected data source;
wherein the step of selecting further includes the step of evaluating an attribute of the CMP EJB to identify the one data source.

6. The method of claim 5, wherein the execution environment is a J2EE platform.

7. A method for accessing a database among a plurality of databases within an execution environment wherein each database is associated with a respective data source, comprising the steps of:
    receiving a request from an executing container managed persistent enterprise java bean (CMP EJB) to access one of the plurality of databases;
    selecting one of the data sources from among the respective data sources;
    connecting the CMP EJB to the selected one of the respective data sources to access the database associated with the selected data source;
    associating with each of the respective data sources a respective resource reference; and
    defining the respective resource references within a session EJB that interfaces with the CMP EJB.

8. The method of claim 7, wherein a map is stored in the execution environment that provides the mapping between the attribute of the CMP EJB and the respective resource references.

9. The method of claim 8, wherein the map defines which of the respective resource references to use depending on a value of the attribute.

* * * * *